(12) United States Patent
Rahman et al.

(10) Patent No.: US 10,616,057 B2
(45) Date of Patent: *Apr. 7, 2020

(54) DATA ANALYTICS FOR ADAPTIVE NETWORKS

(71) Applicant: AT&T Intellectual Property I, L.P., Atlanta, GA (US)

(72) Inventors: Moshiur Rahman, Marlboro, NJ (US); Paritosh Bajpay, Edison, NJ (US); Shiv Kumar, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,837

(22) Filed: Jan. 3, 2019

(65) Prior Publication Data
US 2019/0158357 A1   May 23, 2019

Related U.S. Application Data

(63) Continuation of application No. 15/236,961, filed on Aug. 15, 2016, now Pat. No. 10,187,257, which is a
(Continued)

(51) Int. Cl.
*H04L 12/24* (2006.01)
*H04L 29/08* (2006.01)
(Continued)

(52) U.S. Cl.
CPC ...... *H04L 41/0816* (2013.01); *G06F 9/45558* (2013.01); *G06F 9/4856* (2013.01);
(Continued)

(58) Field of Classification Search
None
See application file for complete search history.

(56) References Cited

U.S. PATENT DOCUMENTS 8,495,611 B2   7/2013   McCarthy et al.
8,713,378 B2   4/2014   Eck et al.
(Continued)

OTHER PUBLICATIONS

"Network Functions Virtualization ! Challenges and Solutions", Strategic White Paper, Executive Summary, Alcatel-Lucent, 2013, 20 pages.
(Continued)

*Primary Examiner* — Tuan C Dao
*Assistant Examiner* — William C Wood
(74) *Attorney, Agent, or Firm* — Guntin & Gust, PLC; Mark Wilinski

(57) ABSTRACT

Aspects of the subject disclosure may include, for example, a method in which first performance data and second performance data are obtained for a first virtual machine and a second virtual machine on a network, the performance data is analyzed, performance of the first virtual machine is predicted, and a performance trend for the first virtual machine is determined. Performance of the second virtual machine is predicted in accordance with analyzing of the second performance data and a potential transfer of execution of an application from the first virtual machine to the second virtual machine. Execution of the application is transferred to the second virtual machine after determining an expected improvement in execution of the application relative to the first virtual machine. Other embodiments are disclosed.

20 Claims, 7 Drawing Sheets

Related U.S. Application Data continuation of application No. 14/496,943, filed on Sep. 25, 2014, now Pat. No. 9,444,886.

(51) Int. Cl.
  *G06F 9/50* (2006.01)
  *G06F 9/455* (2018.01)
  *G06F 9/48* (2006.01)

(52) U.S. Cl.
  CPC .......... *G06F 9/5027* (2013.01); *G06F 9/5077* (2013.01); *G06F 9/5088* (2013.01); *H04L 41/14* (2013.01); *H04L 41/147* (2013.01); *H04L 67/10* (2013.01); *H04L 67/1012* (2013.01); *H04L 67/148* (2013.01); *G06F 2009/4557* (2013.01); *G06F 2009/45595* (2013.01)

(56) References Cited

U.S. PATENT DOCUMENTS

| | | |
|---|---|---|
| 8,719,804 B2 | 5/2014 | Jain |
| 8,745,384 B2 | 6/2014 | Persaud et al. |
| 2005/0091654 A1 | 4/2005 | Lection et al. |
| 2008/0295095 A1 | 11/2008 | Watanabe et al. |
| 2011/0270968 A1 | 11/2011 | Salsburg et al. |
| 2012/0331088 A1 | 12/2012 | O'Hare et al. |
| 2013/0227335 A1 | 8/2013 | Dake et al. |
| 2013/0263119 A1 | 10/2013 | Pissay et al. |
| 2013/0263209 A1 | 10/2013 | Panuganty |
| 2013/0283364 A1 | 10/2013 | Chang et al. |
| 2013/0297802 A1 | 11/2013 | Laribi et al. |
| 2013/0329734 A1 | 12/2013 | Chesla et al. |
| 2014/0007181 A1 | 1/2014 | Sarin et al. |
| 2014/0164618 A1 | 6/2014 | Alicherry et al. |
| 2014/0201374 A1 | 7/2014 | Ashwood-Smith et al. |
| 2014/0282591 A1 | 9/2014 | Stich et al. |
| 2014/0307591 A1 | 10/2014 | Wang et al. |
| 2015/0172203 A1 | 6/2015 | Decusatis et al. |
| 2015/0178107 A1 | 6/2015 | Gummaraju |
| 2015/0248554 A1 | 9/2015 | Dumitru et al. |
| 2015/0249615 A1 | 9/2015 | Chen et al. |
| 2016/0035257 A1 | 12/2016 | Rahman |

OTHER PUBLICATIONS

Kolias, Christos, "Bundling NFV and SDN for Open Networking", NetSeminar @ Stanford, Orange Silicon Valley, May 22, 2014, 37 pages.

DATA ANALYTICS FOR ADAPTIVE NETWORKS

CROSS-REFERENCE TO RELATED APPLICATIONS

This application is a continuation of U.S. patent application Ser. No. 15/236,961, filed Aug. 15, 2016, which is a continuation of U.S. patent application Ser. No. 14/496,943 filed Sep. 25, 2014 (now U.S. Pat. No. 9,444,886). All sections of the aforementioned application(s) and patent(s) are incorporated herein by reference in their entirety.

FIELD OF THE DISCLOSURE

The subject disclosure relates to a system and method for data analytics for adaptive networks in a cloud environment.

BACKGROUND

Providers of communication services are currently implementing network function virtualization (NFV), in which network functions are ported to virtualized environments to enable a migration of services to a cloud-based infrastructure. In some implementations, a software defined network (SDN) controller supports virtualized network functions.

BRIEF DESCRIPTION OF THE DRAWINGS

Reference will now be made to the accompanying drawings, which are not necessarily drawn to scale, and wherein.

DETAILED DESCRIPTION

Figure 1:
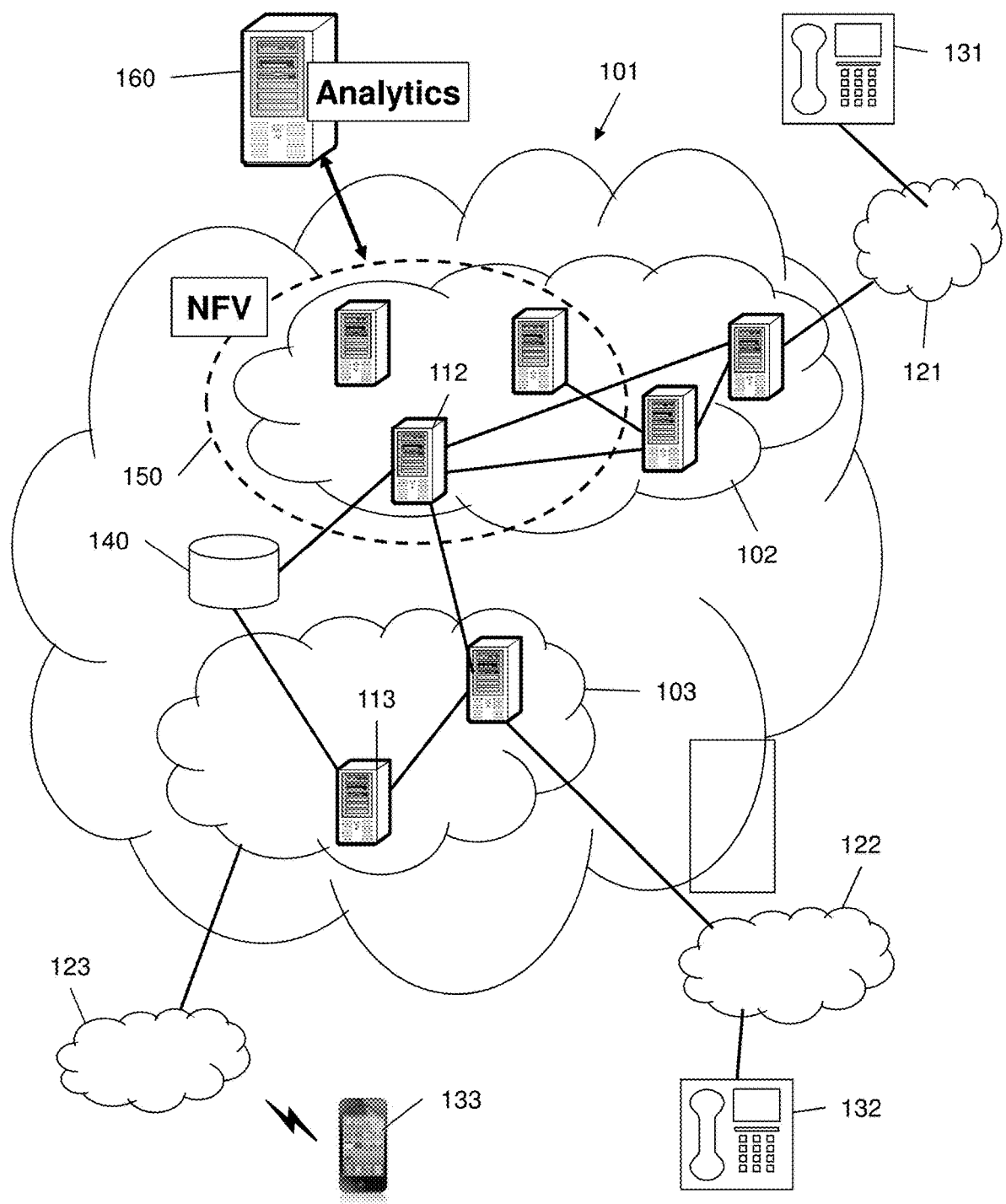
FIG. 1 schematically illustrates NFV in a cloud environment supported by data analytics to support an adaptive network, in accordance with an embodiment of the disclosure.

The subject disclosure describes, among other things, illustrative embodiments for collecting and analyzing performance data of a virtual machine (VM), to manage execution of an application on the VM. Other embodiments are described in the subject disclosure.

One or more aspects of the subject disclosure include a method for maintaining the performance ("health") of an application executing on a virtual machine in a network. If it is determined that an application has become inefficient due to the VM's health, then a procedure is automatically invoked to move the application to another VM, after determining that the move to the target VM is also safe (will not cause loss of performance) through data mining results from static and real-time data.

One embodiment of the subject disclosure includes a method comprising obtaining, by a computing device comprising a processor, first performance data for a first virtual machine on a network; analyzing the first performance data; and predicting a first predicted performance of the first virtual machine. The method also comprises evaluating a potential transfer of execution of an application from the first virtual machine, in accordance with the first predicted performance and a predefined network policy. The method further comprises identifying a second virtual machine on the network; obtaining second performance data for the second virtual machine; analyzing the second performance data; and predicting a second predicted performance of the second virtual machine, in accordance with the analyzing of the second performance data and the evaluating of the potential transfer of execution of the application. The method also comprises determining an expected improvement in execution of the application on the second virtual machine relative to the first virtual machine. The first performance data and the second performance data include static virtual machine performance data relating to past performance of the first virtual machine and second virtual machine respectively and stored at a first storage device accessible to the computing device, and dynamic virtual machine performance data relating to current performance of the first virtual machine and the second virtual machine respectively.

One embodiment of the subject disclosure includes a computing device comprising a memory to store instructions and a processor coupled to the memory. The processor, responsive to executing the instructions, performs operations. The operations comprise obtaining first performance data for a first virtual machine on a network and second performance data for a second virtual machine on the network, the first virtual machine executing an application. The operations also comprise analyzing the first performance data and the second performance data, and predicting a first predicted performance of the first virtual machine. The operations further comprise predicting a second predicted performance of the second virtual machine, in accordance with the analyzing of the second performance data and a potential transfer of execution of the application from the first virtual machine to the second virtual machine. The operations also comprise determining an expected improvement in execution of the application on the second virtual machine relative to the first virtual machine.

One embodiment of the subject disclosure includes a machine-readable storage device comprising instructions which, when executed by a processor, cause the processor to perform operations. The operations comprise obtaining first performance data for a first virtual machine on a network and second performance data for a second virtual machine on the network, analyzing the first performance data and the second performance data, predicting a first predicted performance of the first virtual machine, and determining a performance trend for the first virtual machine. The operations also comprise predicting a second predicted performance of the second virtual machine, in accordance with the analyzing of the second performance data and a potential transfer of execution of an application from the first virtual machine to the second virtual machine. The operations further comprise determining an expected improvement in execution of the application on the second virtual machine relative to the first virtual machine.

FIG. 1 illustrates a system 100 implementing NFV in a cloud environment, in accordance with an embodiment of the disclosure. A network of computing devices is illustrated schematically as cloud 101. It will be appreciated that the cloud can be understood as a resource rather than a collection of point devices.

A plurality of networks can operate in the cloud. In this illustration, network 102 is a first communication services network such as an internet protocol multimedia subsystem (IMS), including a server 112 performing a call session control function (CSCF) and managing session initiation protocol (SIP) messages, which provides services to a public switched telephone network (PSTN) 121. Network 103 is a second communication services network such as an evolved packet core (EPC) including a server 113 operating as a mobility management entity (MME); network 103 provides services to an internet protocol communications network 122 and a mobile telecommunications network (e.g. E-UTRAN) 123. Networks 121, 122, 123 deliver services to telephone equipment 131, 132 and mobile device 133 respectively. In this illustration, networks 102, 103 can be connected via various devices; for example, a home subscriber server (HSS) 140.

In this embodiment, a network 150 of computing devices has virtualized functions (that is, NFV is implemented for that network). The NFV network communicates with a server 160 performing data analytics. In this embodiment, the network is also a software defined network (SDN), and server 160 operates as a controller for the SDN. The data analytics enable the controller to manage the NFV network predictively and adaptively, as detailed below.

Data analytics server 160 can monitor the real-time performance of devices in the NFV network 150, and can also access stored historical data regarding network performance (e.g. data mining for network traffic history). In this embodiment, NFV network 150 also operates as a self-optimizing network (SON); accordingly, the network controller (server 160) must be capable of predicting performance of devices on the network and applications executing on those devices. In this embodiment, server 160 can also expand or contract the network (adding or deleting server capacity) to implement an elastic service model for the network. In particular, server 160 can dynamically allocate resources to handle demand, availability and level of service quality fluctuations. This in turn requires that the server obtain information about network resources (such as virtual machines and applications executing on them) in order to make network performance optimization decisions dynamically.

Performance optimization decisions (adding or removing devices, establishing or terminating virtual machines, transferring an application from one virtual machine to another, etc.) are made in accordance with network performance policies. In an embodiment, these policies specify quality levels of performance metrics (minimum throughput, maximum packet loss, maximum delays, etc.). Policies are implemented by invoking specific procedures for making changes on the network (referred to herein as network orchestration, which itself is automated).

In a particular embodiment, an application executing on a virtual machine (VM) has its performance analyzed (using both historical and real-time data) in comparison to operational norms for the application and/or network policies; that is, the "health" of the application is determined. Similarly, in this embodiment, the VM has its performance analyzed to determine the "health" of the VM. The server 160 performs data analytics and can take action to maintain the health of the application, as follows:

Collect and combine relevant data regarding application performance to determine the health of the application Mine the collected cloud data—stored data (data at rest) and real-time data (data in motion)—to extract network operational data and application intelligence Build patterns and discern relationships and trends in the data to predict application and VM performance and to plan a network adaption Infer actionable intelligence to determine the appropriate policy and rules Push the policy to the network via a defined means (orchestration)

Orchestration optimizes and reconfigures the SDN

Apply real-time analytics capability, trending networks capability, and policy (rules) to predict and adapt VM and application in real time If it is determined that the application (e.g. the IMS CSCF application) is operating inefficiently due to the VM's health, the SDN controller automatically takes action to move the application to another VM (a target VM) after determining that the move to the target VM is safe (that is, the move can be made without degrading application performance and can result in improved performance after the move is complete). This determination can be made by mining network traffic data, using data at rest and data in motion.

Figure 2:
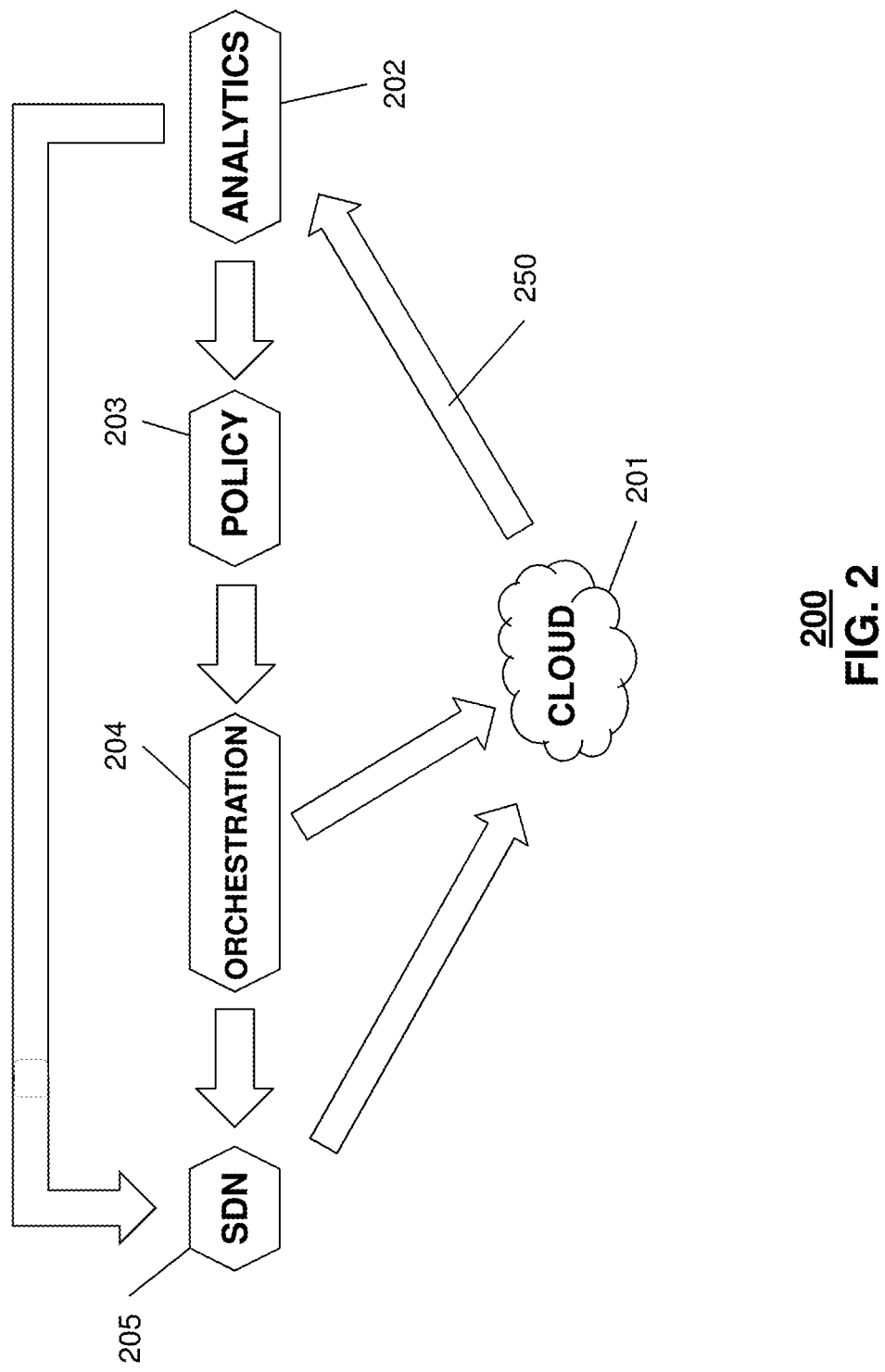
FIG. 2 schematically illustrates analytics, policy and orchestration applied to an adaptive SDN, in accordance with an embodiment of the disclosure.

FIG. 2 schematically illustrates a system 200 wherein analytics, policy and orchestration are applied to an adaptive software-defined network, in accordance with an embodiment of the disclosure. As shown in FIG. 2, an analytics function 202 obtains intelligence 250 from cloud 201. Intelligence 250 includes data regarding network operations and application performance. Intelligence can be obtained from stored historical data (data at rest) and from streaming and correlation of real-time data (data in motion). The analytics function determines which intelligence is actionable; that is, what is usable to determine an appropriate policy 203. An orchestration 204 (defined procedures for reconfiguring the network) is invoked to implement the policy. The SDN 205 applies the orchestration in accordance with the policy to provide adaptive management of the network. It will be appreciated that the network may be too large to manage deterministically in real time, so that it is preferable to manage the network predictively and adaptively.

In an embodiment, the system 200 employs analytics function 202 to analyze network traffic data; specifically, in the case of a communication network, data relating to message traffic. In a particular embodiment, a change in message traffic may be expected due to an anticipated external event (for example, the Super Bowl game). The analytics function 202 can treat the anticipated event as actionable intelligence to orchestrate a reconfiguration of the network, in order to maintain a level of network performance in accordance with network policy.

The analytics function 202 can also discern the effects of unanticipated events on the network and initiate a reconfiguration to respond to those effects. In an embodiment, the analytics function can use real-time data to detect a change in traffic, determine a trend in network performance based on a change in traffic; and initiate a reconfiguration of the network based on the trend, to maintain a level of network performance in accordance with the network policy.

Figure 3:
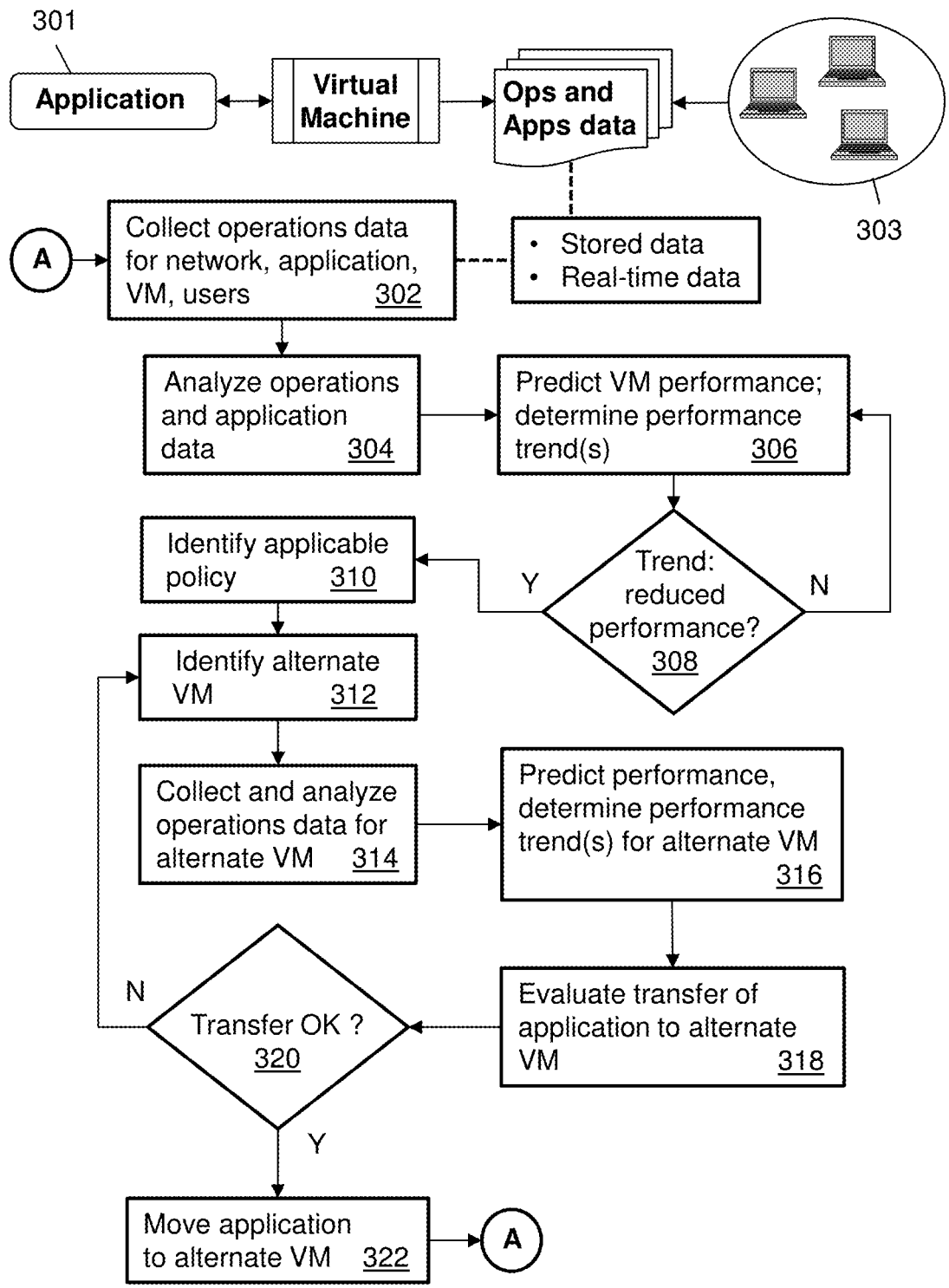
FIG. 3 depicts an illustrative embodiment of a method used in portions of the systems described in FIGS. 1 and 2.

FIG. 3 depicts an illustrative embodiment of a method 300 used for data analytics in an adaptive network. As described above with reference to FIGS. 1 and 2, an adaptive software-defined network (SDN) can include a plurality of virtual machines (VMs). In this embodiment, application 301 can execute on any of the VMs in the network.

In step 302, a controller for the SDN collects operations data relating to the network and to the VM (Ops data), and also collects data relating to performance of the application (Apps data). This data may be historical data retrievable from a storage device (static or "at rest" data), or real-time data obtained by monitoring the application and the network according to predefined metrics (dynamic or "in motion" data). In this embodiment, both the at-rest data and in-motion data are used to analyze the performance of the network and the application. It will be appreciated that the in-motion data can be captured and then stored as new at-rest data. As shown schematically in FIG. 3, operations data can also be collected from user equipment 303 on the network. In particular, network traffic data can be obtained at least in part from equipment of the users 303. In an embodiment, stored historical network traffic data is mined by the controller (executing a data mining application) to discern patterns and trends in network behavior.

The application and operations data is then analyzed (step 304), enabling the controller to predict performance of the VM, and in particular to determine a trend in performance of the application executing on the VM (step 306). If the predicted performance of the application has a negative trend (step 308), then the controller may initiate a transfer of the application to a different VM. In this embodiment, this is done in accordance with a predefined policy identified in step 310. For example, if the application is a call session control function (CSCF) in an internet protocol multimedia subsystem (IMS), performance of the application can be evaluated with respect to several metrics (e.g. throughput, latency, packet loss, delays, etc.), and a transfer to an alternate VM can be invoked if any of the defined metrics falls below (or exceeds) a threshold.

An alternate VM (that is, a target for transfer of the application) is identified (step 312), and operations data relating to this VM are collected and analyzed (step 314). The predicted performance and performance trends for the alternate VM are then determined (step 316). It will be appreciated that this performance/trend information is determined before any transfer of the application to the alternate VM; that is, the status of the alternate VM (which may be viewed as its operational "health") is obtained before the transfer proceeds. The controller is thus enabled to evaluate the effect of the transfer on network operations, the performance of the alternate VM, and the future execution of the application (step 318).

If the condition of the network is such that the transfer is expected to be successful, and performance of the application is predicted to improve (step 320), the application is then moved to the alternate VM (step 322). Otherwise, the application is not transferred, and another alternate VM can be identified and analyzed.

As noted above with reference to FIG. 2, the transfer of the application to the alternate VM is orchestrated—that is, a procedure is invoked for terminating certain network connections, initiating new connections, ensuring that certain tasks are completed prior to the transfer, etc. In this embodiment, the orchestration is performed in accordance with the policy.

In an embodiment, the plurality of VMs is arranged in a hierarchy (first transfer target, second transfer target, etc.), so that an alternate VM is automatically identified when it is determined that a transfer of the application is needed. It will be appreciated, however, that the transfer is not performed automatically, but only after analyzing and predicting performance of the alternate VM and determining that performance of the application is expected to improve.

Figure 4:
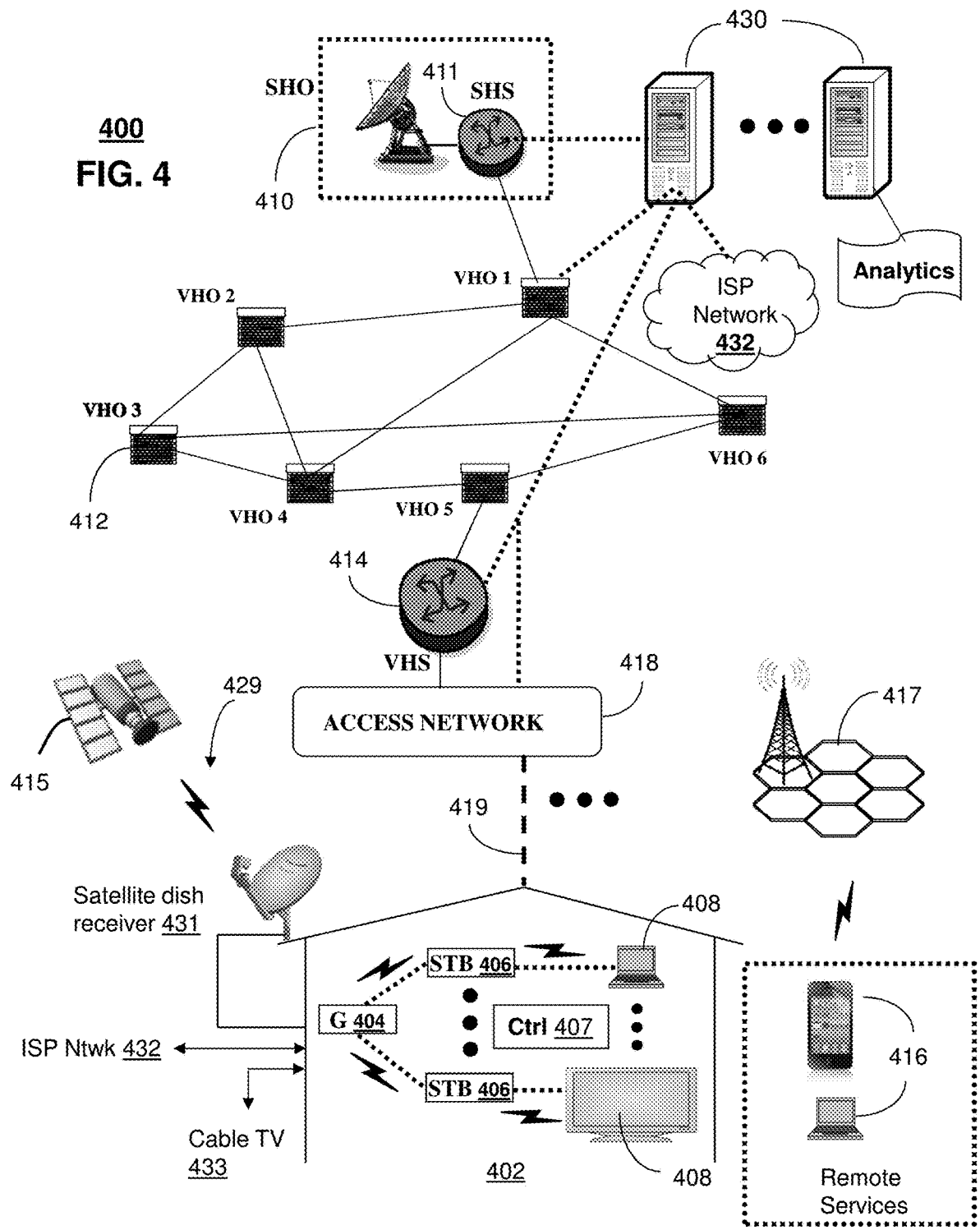
FIGS. 4-5 depict illustrative embodiments of communication systems that provide media services over portions of the a network shown in FIG. 1.

FIG. 4 depicts an illustrative embodiment of a first communication system 400 for delivering media content. The communication system 400 can represent an Internet Protocol Television (IPTV) media system. Communication system 400 can be overlaid or operably coupled with network 101 shown in FIG. 1 or a portion thereof, as another representative embodiment of communication system 400. For instance, one or more devices illustrated in the communication system 400 of FIG. 4 can implement a method that comprises obtaining, by a computing device comprising a processor, first performance data for a first virtual machine on a network; analyzing the first performance data; predicting a first predicted performance of the first virtual machine; evaluating a potential transfer of execution of an application from the first virtual machine, in accordance with the first predicted performance and a predefined network policy; identifying a second virtual machine on the network; obtaining second performance data for the second virtual machine; analyzing the second performance data; predicting a second predicted performance of the second virtual machine, in accordance with the analyzing of the second performance data and the evaluating of the potential transfer of execution of the application; and determining an expected improvement in execution of the application on the second virtual machine relative to the first virtual machine. In this method, the first performance data and the second performance data can include static virtual machine performance data relating to past performance of the first virtual machine and second virtual machine respectively and stored at a first storage device accessible to the computing device, and dynamic virtual machine performance data relating to current performance of the first virtual machine and the second virtual machine respectively.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a data analytics server (herein referred to as server 430). Server 430 can use computing and communication technology to perform function data analytics, which can include among other things, the analyzing and predicting techniques described by method 300 of FIG. 3. For instance, data analytics performed by server 430 can be similar to the functions of server 160 in system 100 of FIG. 1, in accordance with method 300. The media processors 406 and wireless communication devices 416 can be provisioned with software functions to utilize the services of server 430.

Figure 5:
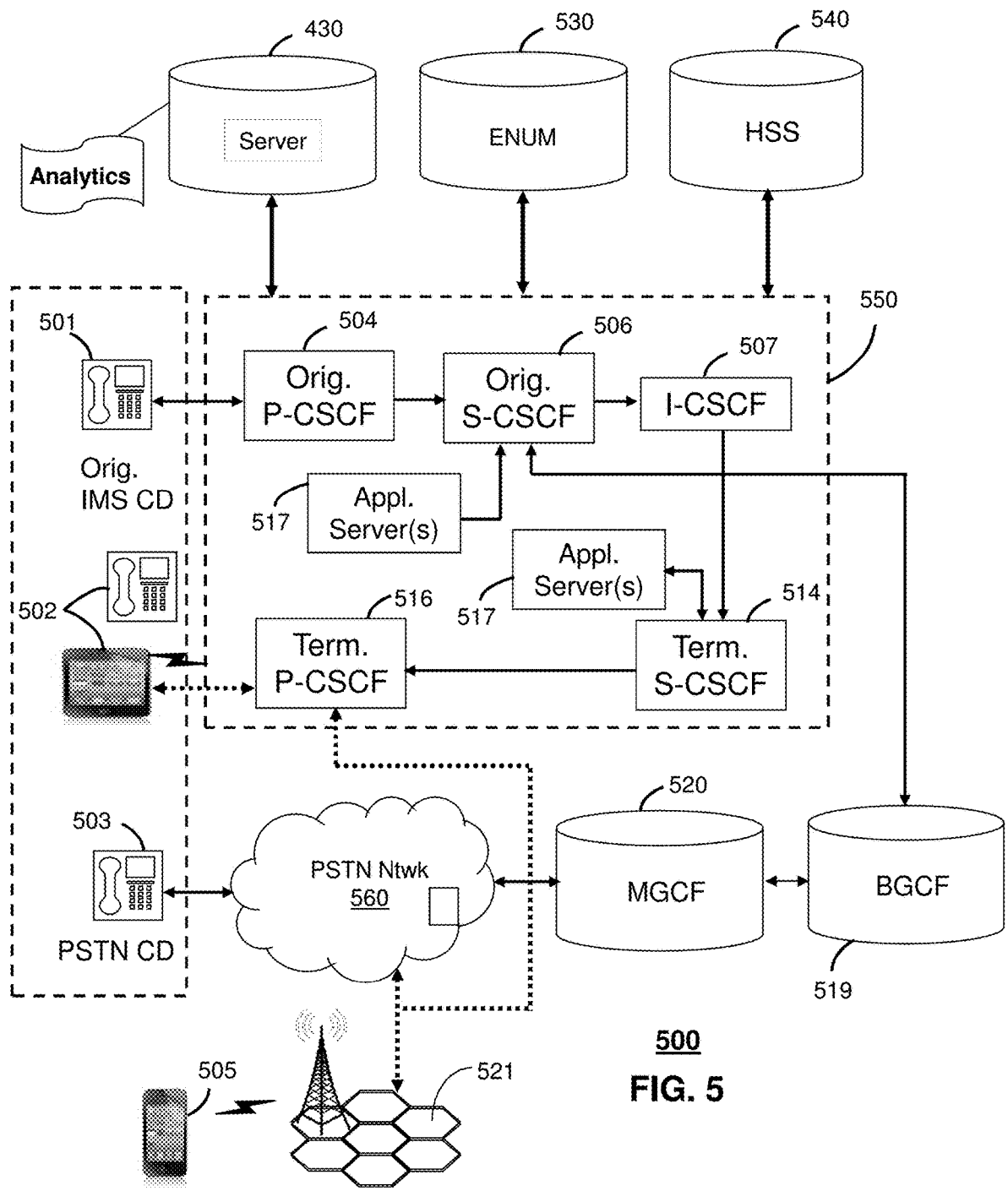

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100-200 of FIGS. 1-2 and communication system 400 as another representative embodiment of communication system 400. In particular, system 500 can include a computing device comprising a memory to store instructions and a processor coupled to the memory, where the processor, responsive to executing the instructions, performs operations comprising obtaining first performance data for a first virtual machine on a network and second performance data for a second virtual machine on the network, the first virtual machine executing an application; analyzing the first performance data and the second performance data and predicting a first predicted performance of the first virtual machine; predicting a second predicted performance of the second virtual machine, in accordance with the analyzing of the second performance data and a potential transfer of execution of the application from the first virtual machine to the second virtual machine; and determining an expected improvement in execution of the application on the second virtual machine relative to the first virtual machine.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can perform data analytics for network(s) that include CDs 501, 502, 503 and 505 of FIG. 5. CDs 501, 502, 503 and 505 can be adapted with software to utilize the services of the server 430. Server 430 can be an integral part of the application server(s) 517, performing data analytics and adapted to the operations of the IMS network 550.

For illustration purposes only, the devices of system 500 that perform call session control functions (including S-CSCF, P-CSCF, and I-CSCF devices) can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
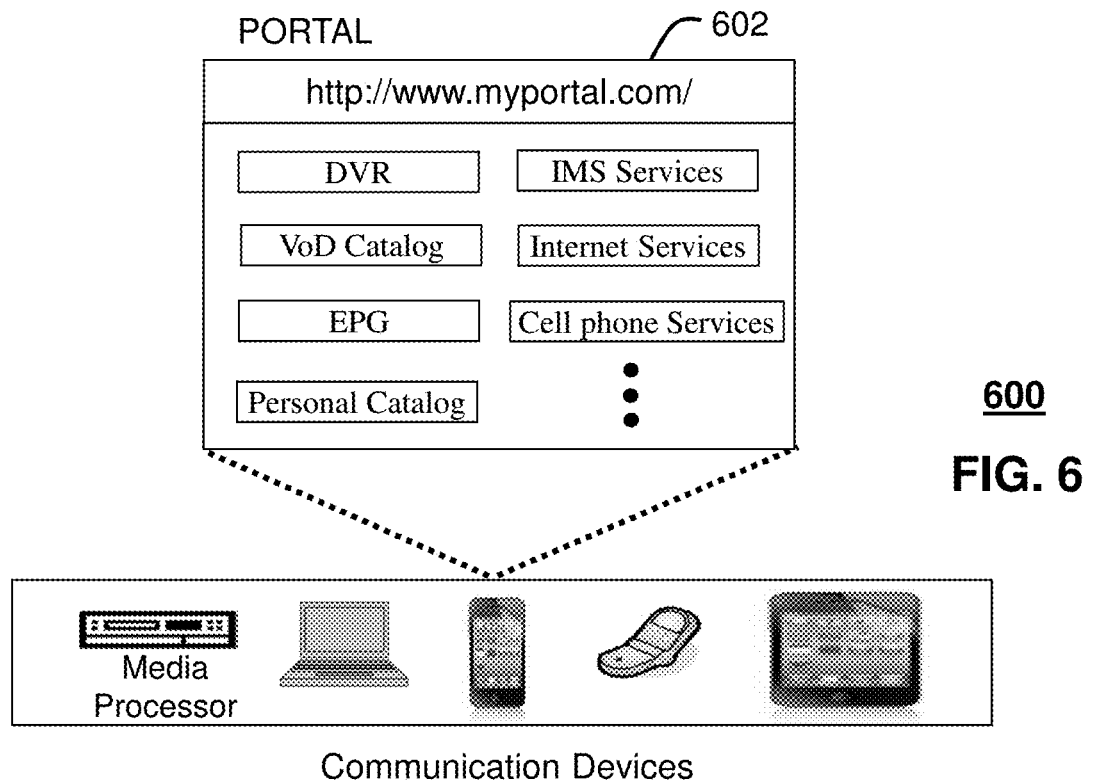
FIG. 6 depicts an illustrative embodiment of a web portal for interacting with the communication systems of FIGS. 1, 4 and 5.

FIG. 6 depicts an illustrative embodiment of a web portal 602 of a communication system 600. Communication system 600 can be overlaid or operably coupled with systems 100-200 of FIGS. 1-2, communication system 400, and/or communication system 500 as another representative embodiment of systems 100-200 of FIGS. 1-2, communication system 400, and/or communication system 500. The web portal 602 can be used for managing services of system 100, system 200, and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications to adapt these applications as may be desired by subscribers and/or service providers of systems 100-200, and communication systems 400-500. For instance, users of the services provided by server 160 or server 430 can log into their on-line accounts and provision server 160 or server 430 with user profiles, contact information, and so on. Service providers can log onto an administrator account to provision, monitor and/or maintain a network in system 100 of FIG. 1 or server 430.

Figure 7:
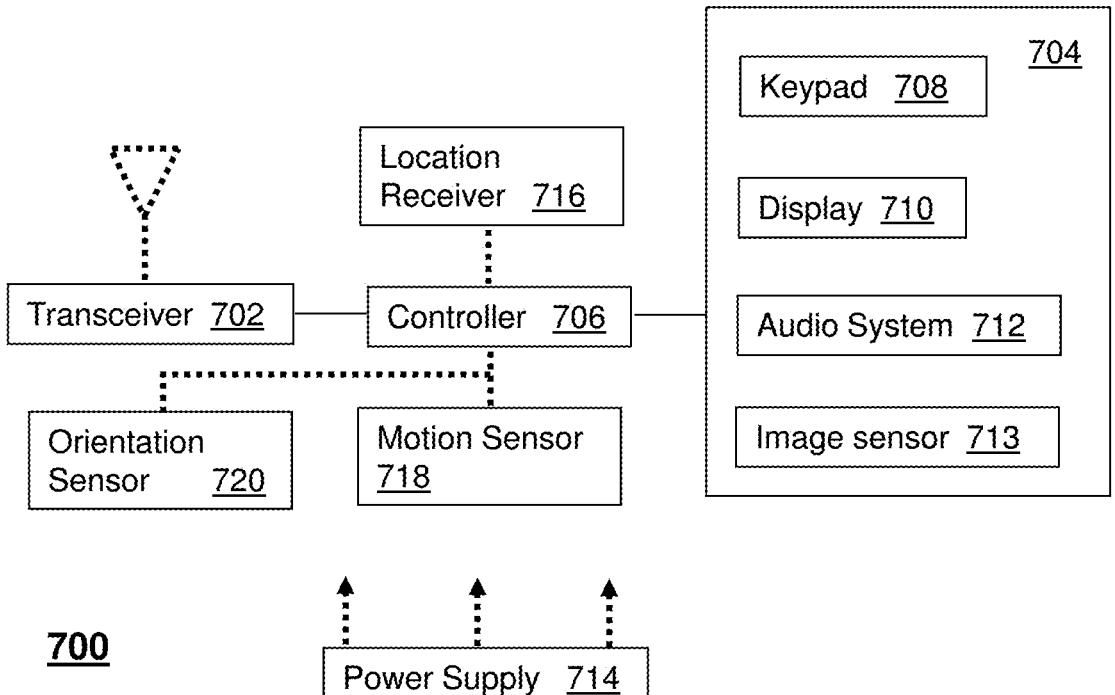
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1-2 and FIGS. 4-5.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices shown in FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100-200 of FIGS. 1-2 and communication systems 400-500 of FIGS. 4-5, such as a gaming console and a media player.

The communication device 700 shown in FIG. 7 or portions thereof can serve as a representation of one or more of the devices of communication system 400, and communication system 500.

Upon reviewing the aforementioned embodiments, it would be evident to an artisan with ordinary skill in the art that said embodiments can be modified, reduced, or enhanced without departing from the scope of the claims described below. For example, the evaluation of the potential transfer of execution of the application from the first virtual machine, can be a total transfer of the execution of the application where one or more other virtual machines take on all of the execution without the first virtual machine performing any of the execution. In another embodiment, the transfer can be of a portion of the execution of the application such that the first virtual machine would potentially continue to execute a remainder of the application that is not intended to be transferred. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
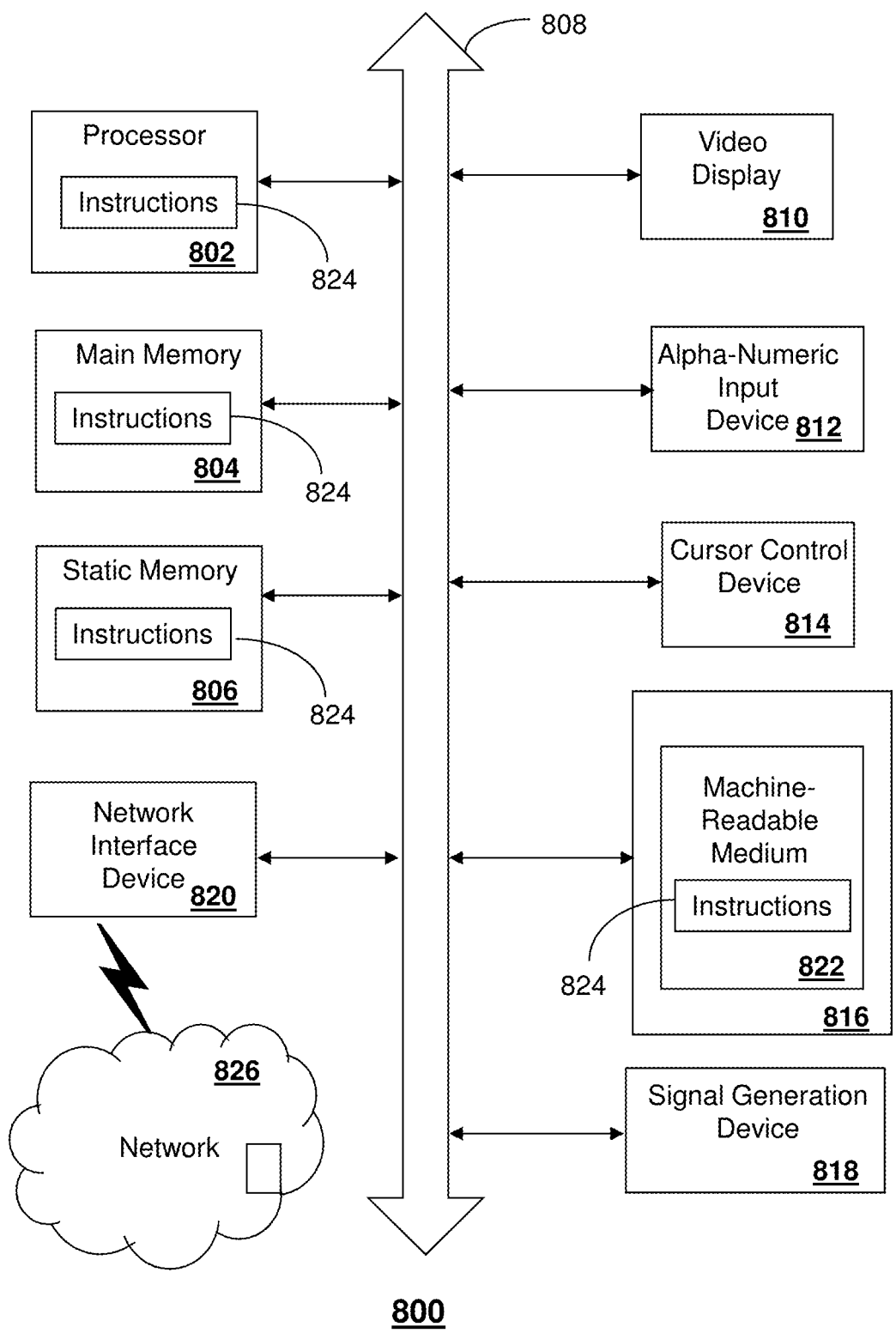
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 430 or the media processor 406, or other devices of FIGS. 1, 4 and 5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   predicting, by a processing system, a first predicted performance of a first virtual machine, wherein the first virtual machine executes an application, and wherein the first virtual machine and a second virtual machine are arranged in a hierarchy of virtual machines;
   predicting, by the processing system, a second predicted performance of the second virtual machine based on first performance data of the first virtual machine, second performance data of the second virtual machine and a potential transfer of execution of the application from the first virtual machine to the second virtual machine; and
   transferring, by the processing system, the execution of the application from the first virtual machine to the second virtual machine based on the first predicted performance and the second predicted performance,
   wherein the second virtual machine is identified in accordance with the hierarchy prior to obtaining the second performance data of the second virtual machine.

2. The method of claim 1, wherein the first virtual machine and the second virtual machine are part of a network that comprises a communication network, wherein the application processes messages transmitted over the communication network, and wherein the first and second predicted performances are based on an expected change in message traffic on the network.

3. The method of claim 2, wherein the transferring of the execution of the application from the first virtual machine to the second virtual machine is further based on a network policy, and wherein the network policy comprises a criterion for evaluating success of the transfer.

4. The method of claim 2, further comprising initiating a reconfiguration of the network based on the expected change in message traffic.

5. The method of claim 1, wherein the transferring of the execution of the application from the first virtual machine to the second virtual machine is further based on an expected improvement in the execution of the application on the second virtual machine relative to the first virtual machine.

6. The method of claim 1, further comprising:
obtaining network performance data including traffic data; and
determining an expected improvement in the execution of the application on the second virtual machine relative to the first virtual machine in accordance with the network performance data,
wherein the transferring of the execution of the application from the first virtual machine to the second virtual machine is further based on the expected improvement.

7. The method of claim 1, wherein the first performance data and the second performance data include operations data obtained from equipment of users of a network.

8. The method of claim 1, further comprising:
determining a performance trend for the first virtual machine; and
evaluating, by the processing system, the potential transfer of the execution of the application from the first virtual machine to the second virtual machine in accordance with the performance trend.

9. The method of claim 1, wherein the first performance data and the second performance data include static virtual machine performance data relating to past performance of the first virtual machine and second virtual machine, respectively.

10. The method of claim 9, wherein the static virtual machine performance data is stored at a first storage device accessible to the processing system.

11. The method of claim 1, wherein the first performance data and the second performance data include dynamic virtual machine performance data relating to current performance of the first virtual machine and the second virtual machine, respectively.

12. The method of claim 1, further comprising:
obtaining network performance data including traffic data;
determining a trend in network performance based on a change in the traffic data; and
initiating a reconfiguration of a network based on the trend to maintain a level of network performance in accordance with a network policy.

13. A computing device comprising:
a processing system including a processor; and
a memory that stores executable instructions that, when executed by the processing system, facilitate performance of operations, the operations comprising:
predicting a first predicted performance of a first virtual machine, wherein the first virtual machine executes an application, wherein the first virtual machine and a second virtual machine are arranged in a hierarchy of virtual machines;
predicting a second predicted performance of the second virtual machine based on first performance data of the first virtual machine, second performance data of the second virtual machine and a potential transfer of execution of the application from the first virtual machine to the second virtual machine; and
transferring the execution of the application from the first virtual machine to the second virtual machine based on the first predicted performance and the second predicted performance,
wherein the second virtual machine is identified in accordance with the hierarchy prior to obtaining the second performance data of the second virtual machine.

14. The computing device of claim 13, wherein the first performance data and the second performance data include static data relating to past performance of the first virtual machine and second virtual machine respectively and stored at a storage device accessible to the computing device and dynamic data relating to current performance of the first virtual machine and the second virtual machine respectively.

15. The computing device of claim 13, wherein the transferring of the execution of the application from the first virtual machine to the second virtual machine is further based on an expected improvement in the execution of the application on the second virtual machine relative to the first virtual machine and in accordance with a network policy.

16. The computing device of claim 13, wherein the operations further comprise:
obtaining network performance data including traffic data; and
determining an expected improvement in the execution of the application on the second virtual machine relative to the first virtual machine in accordance with the network performance data,
wherein the transferring of the execution of the application from the first virtual machine to the second virtual machine is further based on the expected improvement.

17. The computing device of claim 13, wherein the first performance data and the second performance data include operations data obtained from equipment of users of a network.

18. A non-transitory machine-readable storage device comprising instructions which, when executed by a processing system including a processor, cause the processing system to perform operations comprising:
predicting a first predicted performance of a first virtual machine, wherein the first virtual machine executes an application, wherein the first virtual machine and a second virtual machine are arranged in a hierarchy of virtual machines;
predicting a second predicted performance of the second virtual machine, based on first performance data of the first virtual machine, second performance data of the second virtual machine and a potential transfer of execution of the application from the first virtual machine to the second virtual machine; and
transferring the execution of the application from the first virtual machine to the second virtual machine based on the first predicted performance and the second predicted performance,
wherein the second virtual machine is identified in accordance with the hierarchy prior to obtaining the second performance data of the second virtual machine.

19. The non-transitory machine-readable storage device of claim 18, wherein the first performance data and the second performance data include stored static data relating to past performance of the first virtual machine and second virtual machine respectively and accessible to the processing system and dynamic data relating to current performance of the first virtual machine and the second virtual machine respectively.

20. The non-transitory machine-readable storage device of claim 18, wherein the transferring of the execution of the application from the first virtual machine to the second virtual machine is further based on a performance trend and an expected improvement in the execution of the application on the second virtual machine relative to the first virtual machine in accordance with a network policy.

* * * * *